United States Patent
Yip (12)

(10) Patent No.: US 6,229,521 B1
(45) Date of Patent: May 8, 2001

(54) METHOD FOR ANTIALIASING FONTS FOR TELEVISION DISPLAY

(75) Inventor: David C. W. Yip, Sunnyvale, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 08/843,690

(22) Filed: Apr. 10, 1997

(51) Int. Cl.⁷ .................................................. G09G 5/36
(52) U.S. Cl. ............................................ 345/136; 345/138
(58) Field of Search ..................................... 345/136, 138, 345/428, 137, 471; 382/212, 262, 272; 395/162; 340/728

(56) References Cited

U.S. PATENT DOCUMENTS

| | | | | |
|---|---|---|---|---|
| 4,851,825 | * | 7/1989 | Naiman ................................ | 340/728 |
| 4,908,780 | | 3/1990 | Priem et al. ......................... | 364/521 |
| 5,299,308 | * | 3/1994 | Suzuki et al. ........................ | 395/162 |
| 5,444,460 | | 8/1995 | Fujitaka et al. ...................... | 345/144 |
| 5,528,296 | | 6/1996 | Gove et al. .......................... | 348/275 |
| 5,701,365 | * | 12/1997 | Harrington et al. ................. | 382/212 |
| 5,812,139 | * | 9/1998 | Morimoto ............................. | 345/428 |
| 5,848,352 | * | 12/1998 | Dougherty et al. .................. | 455/5.1 |

OTHER PUBLICATIONS

*Antialiasing Transparency*, on–line tutorial by Broad West, web site: http://www.cs.washington.edu/homes/bswest/antialiasing, last modified Dec. 11, 1996.

*SmoothType 1.1*, on–line article by Gregory D. Landweber, web site:http://greg.math.harvard.edu/smoothtype.html, copyright 1996.

*Record Display*, on–line article by Software Patent Institute Database of Software Technologies, web site: http://www.s-pi.org/cgi–bin–newqry?, retrieved from the SPI Database of Software Technologies on Dec. 11, 1996.

*A Commentary on Requirements for the Interoperation of Advanced Television with the National Information Infrastructure*, on–line article by Craig J. Birkmaier, web site: http://www.eeel.nist.gov//advnii/birkmaier.html, retrieved on Dec. 11, 1996.

* cited by examiner

Primary Examiner—Matthew Luu
Assistant Examiner—Jeff Piziali
(74) Attorney, Agent, or Firm—Finnegan, Henderson, Farabow, Garrett & Dunner, LLP (57) ABSTRACT

A method for generating a font for display on an interlaced monitor which is relatively free of the distorting effects of interlacing. The method operates by obtaining an original bitmap for a character in the font which is larger than a desired size for the font. This original bitmap is subjected to a weighted filtering to produce a filtered bitmap. The filtered bitmap is reduced to a desired font size by dividing the filtered bitmap into a plurality of tiles. Each tile is subjected to an unweighted filtering to produce an average value, which is rounded to produce a value for a corresponding pixel in a reduced bitmap. Next, the reduced bitmap is quantized to form a bitmap for display by setting all values which exceed an upper quantization limit to the upper quantization limit, and if necessary, setting all values which are below a lower quantization limit to the lower quantization limit. If a color display is used, pixels within the bitmap for display are used to index a color map, which contains a range of blendings of a font color with a background color, to produce a color bitmap for display. Coefficients in the weighted filtering process can be iteratively adjusted to achieve a satisfactory display of characters within the font on an interlaced monitor.

39 Claims, 7 Drawing Sheets

| 0 | 0 | 0 | 1 | 4 | 1 | 0 | 0 | 0 |
|---|---|---|---|---|---|---|---|---|
| 0 | 0 | 1 | 9 | 11 | 9 | 1 | 0 | 0 |
| 0 | 0 | 6 | 14 | 16 | 14 | 6 | 0 | 0 |
| 0 | 1 | 11 | 20 | 18 | 20 | 11 | 1 | 0 |
| 0 | 6 | 19 | 23 | 20 | 11 | 19 | 6 | 0 |
| 1 | 10 | 16 | 11 | 6 | 11 | 16 | 10 | 1 |
| 6 | 14 | 10 | 1 | 0 | 1 | 10 | 14 | 6 |
| 6 | 12 | 6 | 0 | 0 | 0 | 6 | 12 | 6 |
| 1 | 4 | 1 | 0 | 0 | 0 | 1 | 4 | 1 |

— 220

FILTERED BITMAP

AVERAGE = $\frac{0+1+11+0+6+19+1+10+16}{9}$ = 7

| 1 | 9 | 1 |
|---|---|---|
| 7 | 17 | 7 |
| 7 | 0 | 7 |

METHOD FOR ANTIALIASING FONTS FOR TELEVISION DISPLAY

COPYRIGHT NOTICE PURSUANT TO 37 C.F.R. 1.7(e)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

The present invention relates to the process of displaying characters on a video monitor, and more particularly to techniques for antialiasing fonts for display on an interlaced display, such as a television monitor.

2. Related Art

The standard television format in the United States is NTSC (National Television System Committee), which is encoded in an interlaced form. In NTSC, each frame consists of two interlaced fields which are alternately displayed on a television monitor. One field consists of all of the odd lines of a frame. The other field consists of all the even lines. One artifact of this arrangement is that fine details with high contrast, such as thin white lines on a black background, may be contained only within one of these fields. This causes fine details to flicker on television display, because a field which contains a fine detail is refreshed at half the frequency of the entire frame, and is alternated with the alternate field, which does not contain the fine detail. This causes detailed images such as text to be very unreadable on an interlaced television display.

Antialiasing techniques have been developed to smooth out the jagged edges which result from scan converting the edges of an object for bit-mapped display. These jagged edges are an instance of a phenomenon known as "aliasing." Techniques which are used to reduce or eliminate aliasing are referred to as "antialiasing", and images produced using these techniques are said to be "antialiased". Antialiasing techniques operate by blurring the jagged edges so that they appear to the human eye to be more smooth. This blurring is accomplished by assigning intermediate shading values to the pixels surrounding the edge of an object, wherein these intermediate color values are a mixture of the color of the object and a background color against which the object appears.

Standard antialiasing techniques such as filtering effectively reduce the jagged edges in a standard non-interlaced display such as a computer monitor. However, standard anti-aliasing techniques do not adequately reduce the flickering which occurs near edges of objects in an interlaced display. This flickering makes it especially hard to read characters on an interlaced display; especially characters which are outputted using intricate fonts.

What is needed is a technique for generating antialiasing fonts for display on an interlaced monitor which more effectively reduces the flickering of character features, thereby enhancing the readability of characters on interlaced displays.

SUMMARY

The present invention provides a method for antialiasing fonts which is specifically tailored to overcome the flickering problems associated with interlaced displays. This method starts with an original bit-map of a character in a font, which is preferably a much larger than a desired font size for display. This original bitmap is subjected to a weighted filtering using coefficients which approximate a Gaussian distribution around a pixel in the original bitmap to produce a value for a corresponding pixel in a filtered bitmap. The filtered bitmap is reduced in size by downsampling the filtered bitmap to a desired character size. Finally, if necessary, the pixels in the reduced font are quantized so that the values of individual pixels in the bitmap fall within a fixed range, for example zero to eight. This process is repeated using different coefficients in the weighted filtering process to attain the best quality display for a given font. If a color display is used, the font color is blended with a background color by using the quantized values in the bitmap for display to index an entry in a color map comprising a range of blendings of the font color and the background color.

Accordingly, the present invention can be characterized as a method for antialiasing fonts comprising: obtaining an original bitmap of a character in the font which is larger than a desired font size for the character; performing a weighted filtering on the original bitmap to form a filtered bitmap by computing each pixel in the filtered bitmap as a weighted average of pixels in the neighborhood of a corresponding pixel in the original bitmap; and reducing the filtered bitmap to the desired size to form a reduced bitmap so that each pixel in the reduced bitmap corresponds to a block of pixels in the filtered bitmap, and each pixel in the reduced bitmap is a weighted average of pixels in the corresponding block in the filtered bitmap.

According to an aspect of the present invention, the method for antialiasing fonts further includes the step of quantizing the reduced bitmap to form a bitmap for display by setting pixels which exceed an upper limit to the upper limit, and if necessary, setting pixels which are below a lower limit to the lower limit.

According to another aspect of the present invention, the method for antialiasing fonts further includes the step of using pixels in the reduced bitmap to index a color map which contains a range of blendings of a font color with a background color to produce a color bitmap for display.

According to yet another aspect of the present invention, the method for antialiasing fonts further includes the step of outputting the reduced bitmap to an interlaced display, and more particularly to a television display.

According to another aspect of the present invention, the step of obtaining an original bitmap of a character includes: rasterizing the original bitmap from a vector description; manually creating an original bitmap with a graphical editing tool, or other type of graphical input device; or obtaining an original bitmap from a pre-existing bitmap description file.

According to yet another aspect of the present invention, the step of performing a weighted filtering uses a plurality of coefficients which approximate a Gaussian distribution around a corresponding pixel in the original bitmap.

According to another aspect of the present invention, the step of performing a weighted filtering uses a plurality of coefficients and includes the step of adjusting the plurality of coefficients for each font.

According to another aspect of the present invention, the step of reducing the filtered bitmap uses a plurality of equal coefficients to compute the weighted average so that the weighted average becomes an unweighted average.

Other aspects and advantages of the present invention can be seen upon review of the figures, the description, and the claims which follow.

DESCRIPTION

The following description is presented to enable any person skilled in the art to make and use the invention, and is provided in the context of a particular application and its requirements. Various modifications to the preferred embodiment will be readily apparent to those skilled in the art, and the general principles defined herein may be applied to other embodiments and applications without departing from the spirit and scope of the present invention. Thus, the present invention is not intended to be limited to the embodiment shown, but is to be accorded the widest scope consistent with the principles and features disclosed herein.

Figure 1:
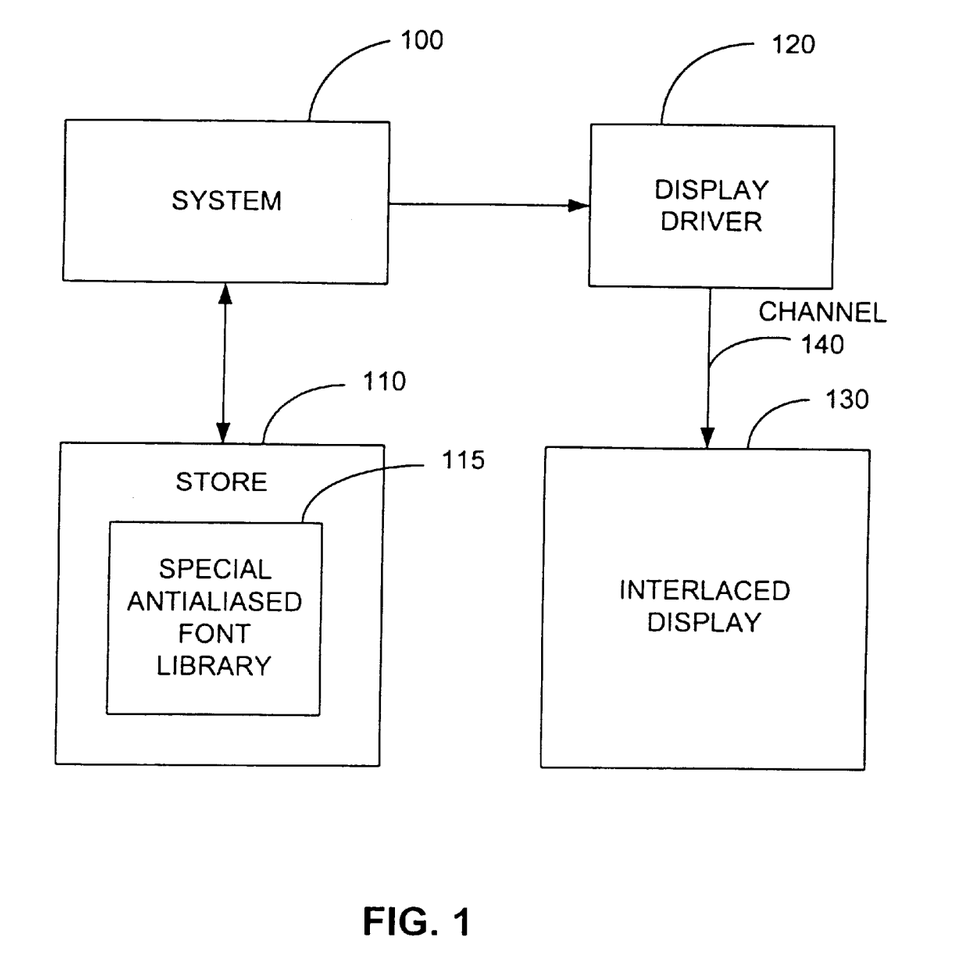
FIG. 1 is a block diagram of a system for outputting special antialiased fonts to an interlaced display in accordance with an aspect of the present invention.

FIG. 1 is a high level diagram of a system for outputting special antialiased fonts to an interlaced display in accordance with an aspect of the present invention. System 100 controls the outputting of fonts to interlaced display 130. In one embodiment of the present invention, system 100 comprises a collection of hard-wired logic which controls the display of fonts on an interlaced display 130. In another embodiment, system 100 is a dedicated graphics processor which controls the display of fonts on interlaced display 130. In yet another embodiment, system 100 is a general purpose processor in a general purpose computing system which controls the display of fonts on interlaced display 130.

System 100 connects to store 110, which contains special antialiased font library 115. In one embodiment, store 110 is a semiconductor memory. In another embodiment, store 110 takes the form of a rotating storage device, such as a disk drive. In yet another embodiment, store 110 takes the form of nonvolatile semiconductor memory.

System 100 additionally connects to display driver 120, which connects through channel 140 to interlaced display 130. Display driver 120 takes input from system 100 in digital form and outputs signals to drive interlaced display 130 across channel 140. Interlaced display 130 is a video monitor on which an image is displayed in interlaced form. In one embodiment, interlaced display 130 is a television monitor which accepts signals in NTSC format. In another embodiment, interlaced display 130 is a television monitor which accepts signals in PAL format.

The system illustrated in FIG. 1 operates as follows. First special antialiased font library 115 is generated using techniques discussed below. Next, special antialiased font library 115 is recorded within store 110. In order to display a character to interlaced display 130, system 100 first indexes a bitmap corresponding to the character within special antialiased font library 115. If a font color must be mixed with a background color, pixels within the bitmap are used to index a color map containing a range of blendings of the font color with a background color to create a color bitmap of the character. This bitmap is sent to display driver 120. Display driver 120 converts the digital input from system 100 into another form for transmission across channel 140 to interlaced display 130. In one embodiment of the present invention, display driver 120 converts the digital input from system 100 into a NTSC signal, which is transmitted across channel 140, and then appears on interlaced display 130. In another embodiment, channel 140 takes the form of a television broadcast through the airwaves. In another embodiment, it takes the form of a cable television connection.

Figure 2:
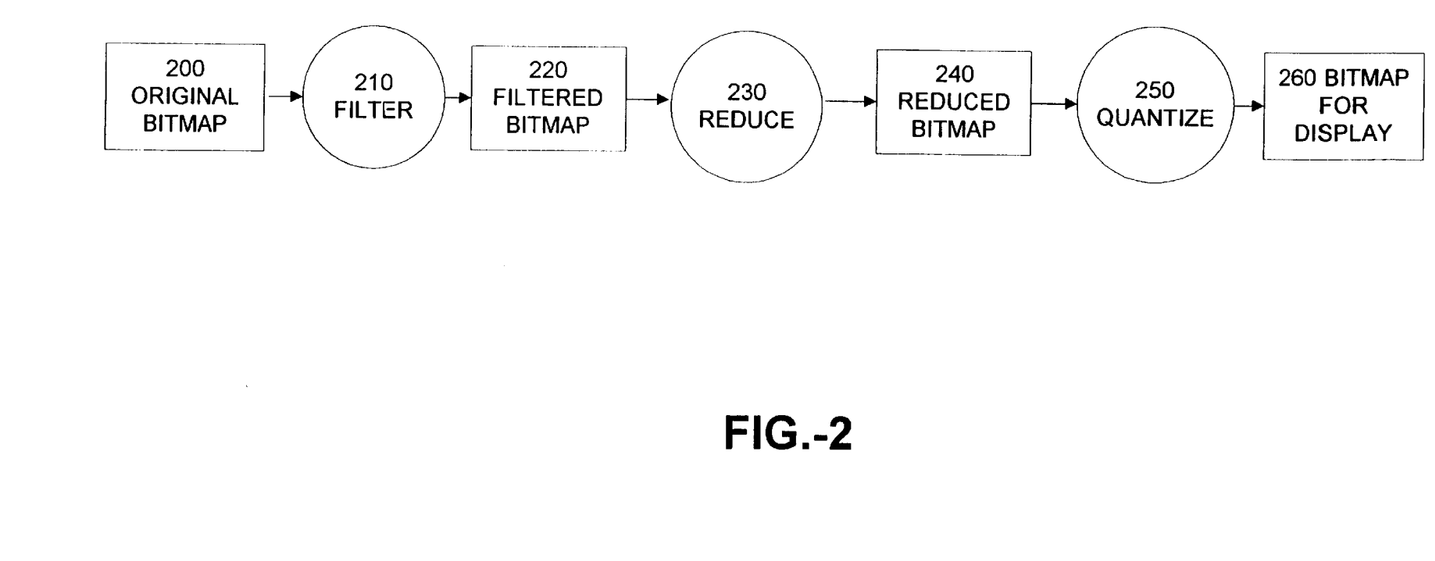
FIG. 2 is a chart illustrating the sequence of operations involved in generating a special font for interlaced display in accordance with an aspect of the present invention.

FIG. 2 is a chart illustrating the sequence of operations involved in converting an original bitmap 200 into a bitmap for display 260 in accordance with an aspect of the present invention. Original bitmap 200 is an initial bitmap for a character in a font. Bitmap 200 includes a magnitude value for each pixel within the original bitmap. This value specifies a monochromatic intensity level for each pixel. In one embodiment of the present invention, this bitmap is obtained from a standard bitmap description file. In another embodiment, original bitmap 200 is rasterized from a vector description of the character. In yet another embodiment, original bitmap 200 is created by hand, possibly using a graphical editor. For good results, original bitmap 200 is several times the desired size of the font.

Original bitmap 200 is filtered at step 210 to produce filtered bitmap 220. Filtered bitmap 220 is reduced at step 230 to produce reduced bitmap 240. Reduced bitmap 240 is then quantized at step 250 to produce bitmap for display 260. Bitmap for display 260 is then stored within store 110 as part of special antialiased font library 115. It can then be retrieved as desired to generate a character for display on interlaced display 130.

In one embodiment of the present invention, the operations involved in converting an original bitmap 200 into a bitmap for display 260 are carried out by computer system 100 executing the computer code which appears in Table 1. Details of these operations are described below.

TABLE 1

```
/* Copyright 1996, Diba Inc. */
/* filter the font */
void filter(struct eachfont *character, int spacing)
{
    /* the 3x3 filter kernel */
    unsigned char kernel[3][3] = { { 1, 2, 1}, { 2, 8, 2}, { 1, 2, 1}
};
    unsigned short x, y;
    short sum, xx, yy, kx, ky;
    unsigned char *temp;
    /* copy the image containing each character to
       a temporary array to be worked on */
    temp = malloc(character->height*character->width);
    if (!temp)
```

TABLE 1-continued

```
    return;
memcpy(temp,character->bitmap,character->height*character->width);
/* step through each pixel of the character and filter it */
for(y=0;y<character->height;y++)
    for(x=0;x<character->width;x++) {
        sum = 0;
        /* step through the filter kernel for each character */
        for(yy=y-1,ky=0;yy<=y+1;yy++,ky++) {
            kx = 0;
            for(xx=x-1,kx=0;xx<=x+1;xx++,kx++) {
                if (! (yy < 0 || (unsigned)yy == character->height ||
                    xx < 0 || (unsigned)xx == character->width))
                    sum += temp[yy*character->width+xx]*kernel[kx] [ky];
            }
        }
        /* compute a weighted average */
        sum /= 12;
        /* limit the bounds to a value between 0 and 63 */
        if (sum < 0)
            sum = 0;
        else if (sum > 63)
            sum = 63;
        /* put the value back into the character bitmap */
        character->bitmap[y*character->width+x] = sum;
    }
    character->dwidth += spacing;
    free(temp);
}
/* Do a filtered down sampling of each character. */
/* INC is the amount by which to shrink the character. */
void decimate(struct eachfont *character)
{
    int x, y, sum, kx, ky, newheight, newwidth;
    unsigned char *temp;
    temp = malloc(character->height*character->width);
    if (!temp)
        return;
    memcpy(temp,character->bitmap,character->height*character->width);
    /* compute the new dimensions of the character */
    newheight = character->height/INC;
    if (character->height%INC)newheight++;
    newwidth = character->width/INC;
    if (character->width%INC)newwidth++;
    /* step through the bitmap representation of the character */
    for(y=0,ky=0;y<newheight;y++,ky+=INC)
        for(x=0,kx=0;x<newwidth;x++, kx+=INC)
        {
            int mx, my;
            sum = 0;
            /* add up the average of the INC*INC area surrounding each
character
            pixel */
            for(my=ky;my<ky+INC;my++)
                for(mx=kx;mx<kx+INC;mx++)
                    if (my < character->height && mx < character->width)
                        sum += temp[my*character->width+mx];
            /* calculate a weighted average for each pixel */
            sum /= INC*INC;
            /* bound it to a number between 0 and 63 */
            if (sum < 0)
                sum = 0;
            else if (sum > 63)
                sum = 63;
            character->bitmap[y*newwidth+x] = sum;
        }
    /* update the font structure */
    character->height = newheight;
    character->width = newwidth;
    character->xoffset = character->xoffset/INC;
    character->yoffset = character->yoffset/INC;
    if (character->dwidth%INC)
        character->dwidth = character->dwidth/INC + 1;
    else
        character->dwidth = character->dwidth/INC;
    free(temp);
}
```

Figure 3:
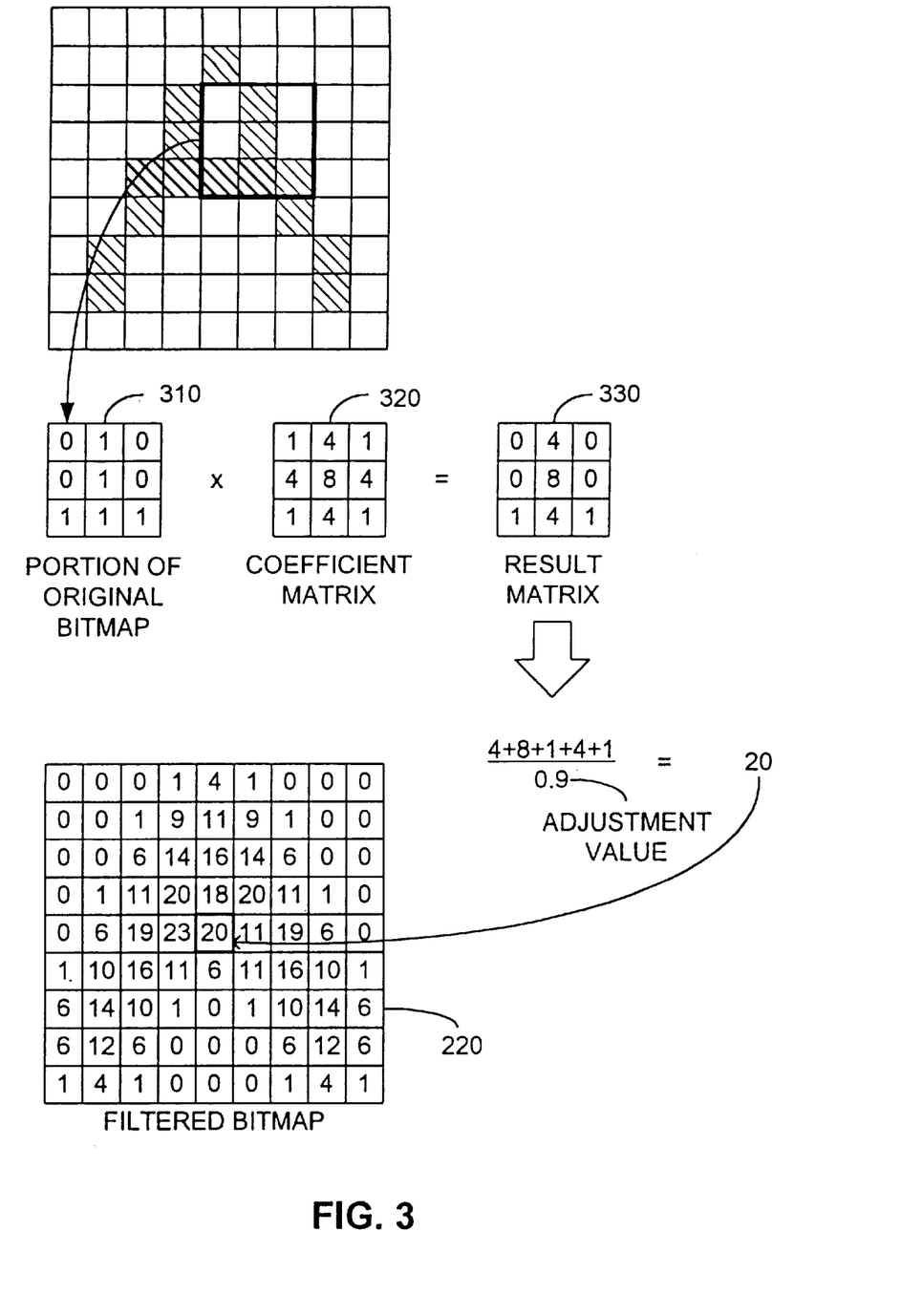
FIG. 3 illustrates the process of performing a weighted filtering on an original bitmap 200 using a coefficient matrix 320 to produce a filtered bitmap 220 in accordance with an aspect of the present invention.

FIG. 3 illustrates the process of filtering original bitmap 200 using coefficient matrix 320 to produce filtered bitmap 220. The filtering process starts with original bitmap 200, which is larger than the desired font size for the character. As illustrated in FIG. 3, a portion 310 of original bitmap 200 is retrieved from original bitmap 200. In this example, portion 310 includes a binary value for each pixel indicating whether or not the pixel is blackened in original bitmap 200. Portion 310 of original bitmap 200 is then multiplied element-by-element with coefficient matrix 320, which contains a weighted kernel of coefficients, to produce result matrix 330. Next, result matrix 330 is summed up element-by-element and then divided by an adjustment value, which in this example is equal to 0.9. The result is rounded and then stored in a corresponding location in filtered bitmap 220. This process is repeated to compute each pixel in filtered bitmap 220.

In the example illustrated in FIG. 3, the coefficient matrix 320 is a 3×3 matrix of coefficients corresponding to the weights assigned to pixels within original bitmap 200. In other embodiments, coefficient matrix 320 assumes different sizes and shapes. For example, in one embodiment, coefficient matrix 320 is rectangular; in another embodiment coefficient matrix 320 approximates a circular form. In yet another embodiment, coefficient matrix 320 is a square area of 5×5 pixels.

Figure 4:
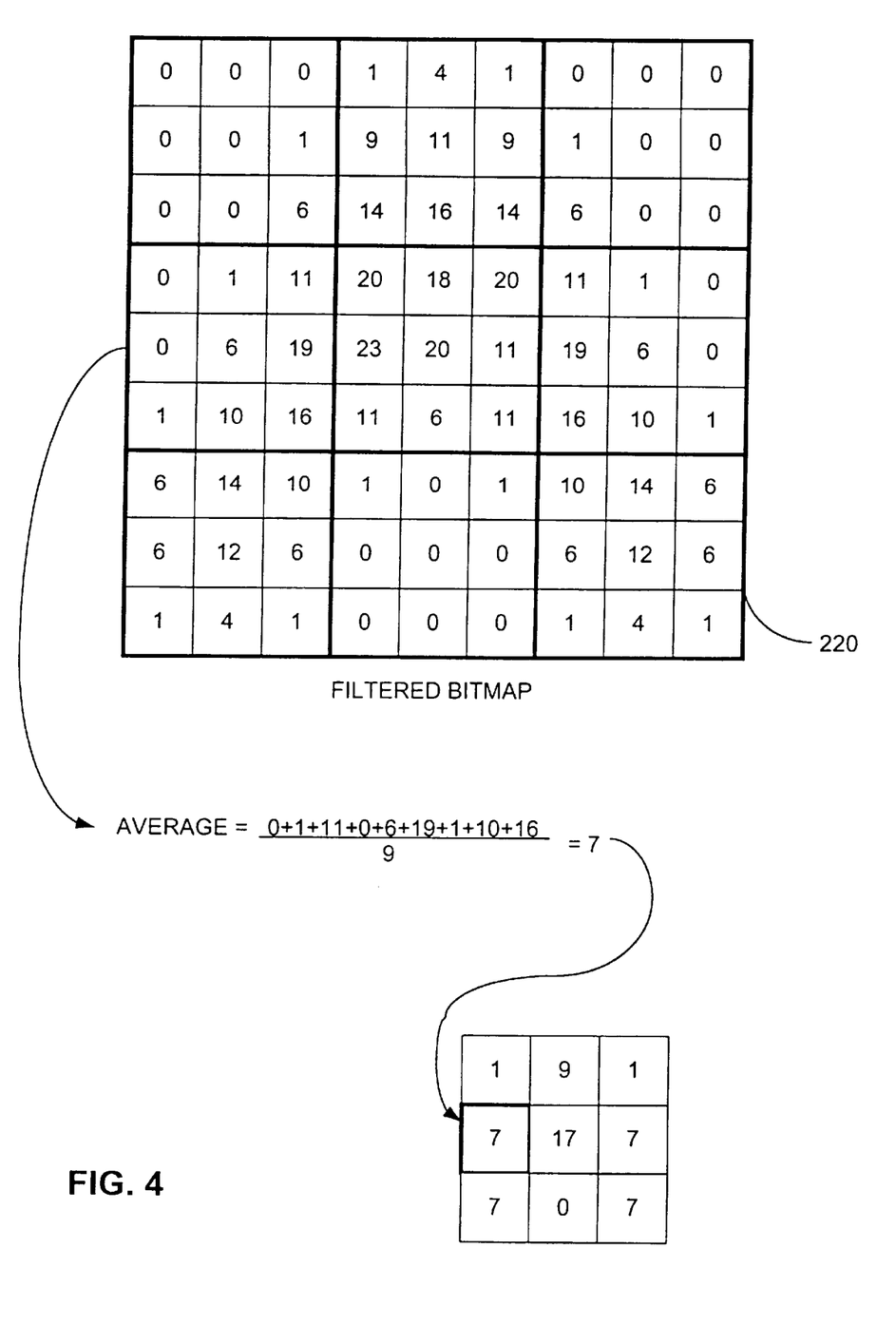
FIG. 4 illustrates the process of downsampling a filtered bitmap 220 to create a reduced bitmap 240 in accordance with an aspect of the present invention.

FIG. 4 illustrates the process of downsampling filtered bitmap 220 to produce reduced bitmap 240. First, filtered bitmap 220 is divided into a number of square tiles, wherein each tile corresponds to a respective bit within reduced bitmap 240. In the example in FIG. 3, filtered bitmap 220 is 9×9 pixels in size, and is divided into nine 3×3 tiles, each corresponding to a respective bit within reduced bitmap 240. The downsampling process performs an unweighted filtering of the pixels in each tile to produce a value for the corresponding pixel within reduced bitmap 240. This value is rounded to the nearest integer value. In this example, the value stored in the corresponding pixel within reduced bitmap 240 is the average of all of the values within the corresponding tile in filtered bitmap 220.

FIG. 4 illustrates how this average is taken for a particular tile, which contains the numbers 0, 1, 11, 0, 6, 19, 1, 10 and 16. These values are summed up, divided by 9 and then rounded to produce an average value of 7, which is stored in the corresponding pixel within reduced bitmap 240. The other pixels within reduced bitmap 240 are calculated in the same way from corresponding tiles in filtered bitmap 220.

The size and shape of the tiles used to perform the downsampling is determined by the difference in size between the original bitmap 200 and the reduced bitmap 240. FIG. 4 illustrates a downsampling which accomplishes a reduction in size of three times in both vertical and horizontal dimensions. Consequently, each tile in filtered bitmap 220 corresponding to a single pixel in reduced bitmap 240 is 3×3 pixels in size. Reductions of larger or smaller magnitudes in either horizontal or vertical dimensions require different corresponding tile sizes.

Figure 5:
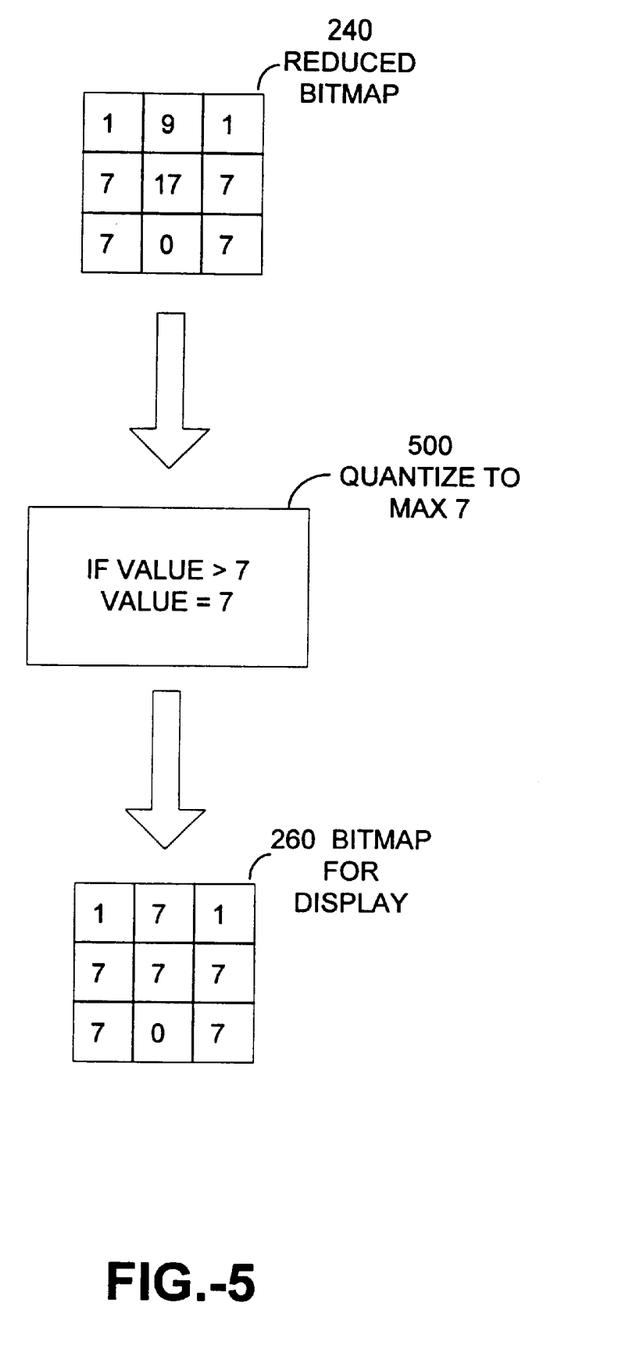
FIG. 5 illustrates the process of quantizing a reduced bitmap 240 to create a bitmap for display 260 in accordance with an aspect of the present invention.

FIG. 5 illustrates the process of quantizing reduced bitmap 240 to produce bitmap for display 260. In the example in FIG. 5, reduced bitmap 240 is quantized to a maximum value of eight. This means that if the value of a pixel within reduced bitmap 240 exceeds eight, the pixel is set to eight. This process is repeated for each pixel within reduced bitmap 240 to produce a quantized bitmap for display 260.

In the example in FIG. 5, only two values within reduced bitmap 240 are greater than seven, namely nine and 17. These two values are set to the maximum value of seven. All other values are less than seven, and they are simply copied straight across from reduced bitmap 240 to bitmap for display 260. In another embodiment of the present invention, the quantization process additionally includes the step of establishing a lower quantization limit, and ensuring that all of the values within bitmap for display 260 are equal to or above the lower quantization limit. For example, if a value within reduced bitmap 240 is less than a lower quantization limit of zero, the value is set to zero. The step of setting a lower quantization limit is not required if reduced bitmap 240 contains no negative values.

Figure 6:
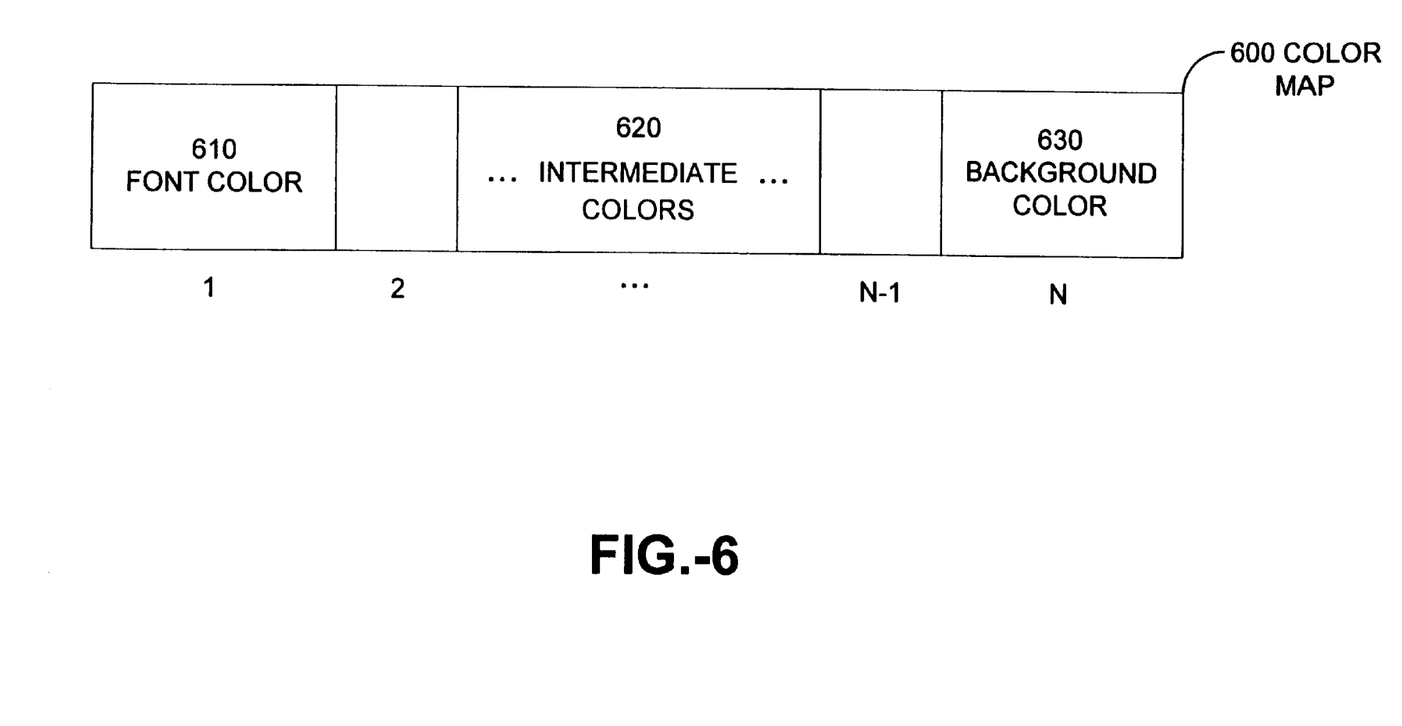
FIG. 6 illustrates a color map containing a range of blendings of a font color with a background color in accordance with an aspect of the present invention.

If a color display is used, it is necessary to mix a font color with a background color to produce a color bitmap for display. This is accomplished by using a color map 600.

FIG. 6 illustrates a color map 600 which is used to mix font color 610 with background color 630 to produce an intermediate color for display on interlaced display 130. This process is performed once a font color and a background color are determined. Bitmap for display 260 comprises a set of discrete values for each pixel which index an entry within color map 600. Color map 600 contains N entries representing a range of mixings of font color 610 with background color 630. Within color map 600, intermediate colors 620 are a linear combination of font color 610 and background color 630. Entry number 1 is purely font color 610. Entries closer to font color 610 contain more of font color 610 and less of background color 630. Entries closer to background color 630, contain more of background color 630 and less of font color 610. Entry N is purely background color 630. In another embodiment of the present invention, intermediate colors 620 are non-linear combinations of font color 610 and background color 630.

Figure 7:
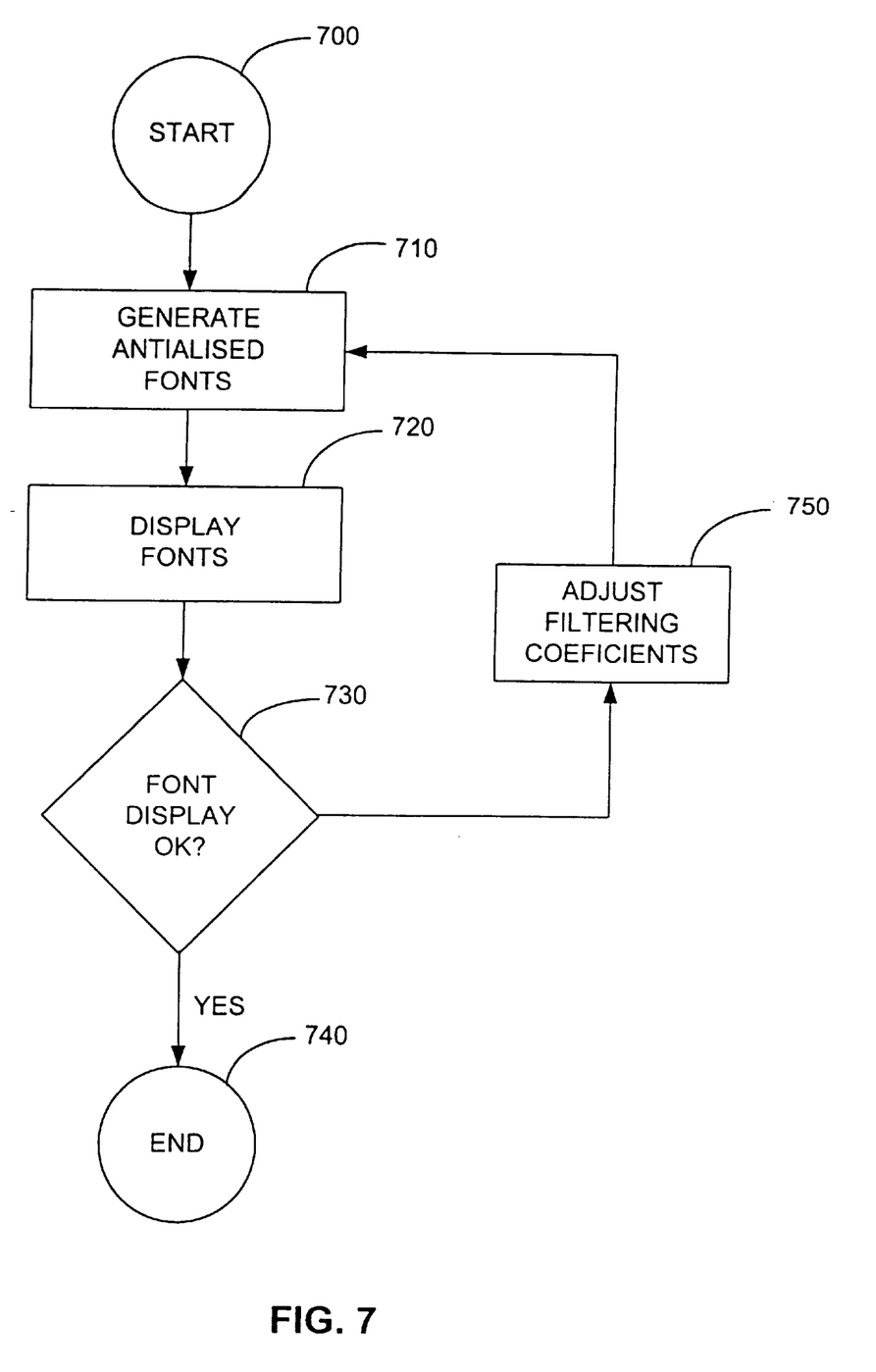
FIG. 7 is a flow chart illustrating the process of iteratively adjusting the filtering coefficients for the weighted filtering process to improve display quality of a font on an interlaced display in accordance with an aspect of the present invention.

FIG. 7 is a flow chart illustrating the iterative process of adjusting the filtering coefficients to improve the image quality of a font on an interlaced display. Step 700 is a start state. From Step 700, the system proceeds to step 710, in which an antialiased font is generated by the process illustrated in FIG. 2. Each character in the font is converted from an original bitmap 200 to a bitmap for display 260 using the sequence of steps illustrated in FIG. 2, and using a particular set of coefficients for the filter step 210. Next, the system advances to step 720 in which the fonts are displayed to an interlaced display. The system then advances to step 730, in which the displayed fonts are examined to determine their quality. If the font quality is OK, the system proceeds to end state 740, and a satisfactory font library has been created. If the display of the font is not of acceptable quality, the system proceeds to step 750. At step 750, the coefficients for the weighted filtering process within step 710 are adjusted. The system then returns to step 710, and the process of generating antialiased fonts is repeated. This process of generating fonts and adjusting filtering coefficients illustrated in FIG. 7 is repeated until either a satisfactory antialiased font is generated, or it is determined that a satisfactory antialiased font cannot be generated.

CONCLUSION

Accordingly, the present invention provides a method for producing antialiased fonts for display on an interlaced video monitor. The antialiased fonts are produced by obtaining bitmaps for the font which are much larger than a desired size for the font. These bitmaps are subjected to a weighted filtering and are then reduced in size by downsampling to produce reduced bitmaps of a desired font size. The reduced bitmaps are then rounded and quantized. If a color display is used, the quantized values are used to index a color map which contains a range of blendings of a font color with a background color. If necessary, the coefficients used in the weighted filtering process are iteratively adjusted to improve the quality of an antialiased font as displayed on an interlaced monitor. In this way, characters can be displayed on an interlaced monitor in a more readable flicker-free form.

The foregoing description of the preferred embodiment of the invention has been presented for purposes of illustration and description. It is not intended to be exhaustive or to limit the invention to the precise fonts disclosed. Obviously, many modifications and variations will be apparent to practitioners skilled in this art. It is intended that the scope of the invention be defined by the following claims and their equivalents.

What is claimed is:

1. A method for antialiasing fonts for and displaying fonts on an interlaced display, comprising:

obtaining an original bitmap of a character in the font which is larger than a desired font size for the character;

performing a weighted filtering on the original bitmap to form a filtered bitmap by computing each pixel in the filtered bitmap as a weighted average of pixels in the neighborhood of a corresponding pixel in the original bitmap;

reducing the filtered bitmap to the desired size to form a reduced bitmap so that each pixel in the reduced bitmap corresponds to a corresponding block of pixels in the filtered bitmap, and each pixel in the reduced bitmap is a weighted average of pixels in the corresponding block in the filtered bitmap;

generating a bitmap for display from the reduced bitmap;

storing the bitmap for display in a memory;

retrieving the bitmap for display from the memory; and outputting the bitmap for display to the interlaced display.

2. The method for antialiasing fonts for and displaying fonts on an interlaced display of claim 1, further including the step of quantizing the reduced bitmap by setting pixels which exceed an upper limit to the upper limit.

3. The method for antialiasing fonts for and displaying fonts on an interlaced display of claim 1, further including the step of quantizing the reduced bitmap by setting pixels which exceed an upper limit to the upper limit, and setting pixels which are below a lower limit to the lower limit.

4. The method for antialiasing fonts for and displaying fonts on an interlaced display of claim 1, wherein the step of generating a bitmap for display from the reduced bitmap uses pixel values from the reduced bitmap to index a color map which contains a range of blendings of a font color with a background color to produce a color pixel for the bitmap for display.

5. The method for antialiasing fonts for and displaying fonts on an interlaced display of claim 1, wherein the step of generating a bitmap for display from the reduced bitmap uses pixel values from the reduced bitmap to index a table which contains a range of blendings of a black font color with a white background color to produce a grey-scale value for a pixel in the bitmap for display.

6. The method for antialiasing fonts for and displaying fonts on an interlaced display of claim 1, wherein the step of outputting a character generated from the bitmap for display to the interlaced display outputs the character generated from the bitmap for display to a television display.

7. The method for antialiasing fonts for and displaying fonts on an interlaced display of claim 1, wherein the step of outputting a character generated from the bitmap for display broadcasts a signal generated from the bitmap for display on a television frequency for television display.

8. The method for antialiasing fonts for and displaying fonts on an interlaced display of claim 1, wherein the step of obtaining an original bitmap of a character includes rasterizing the original bitmap from a vector description.

9. The method for antialiasing fonts for and displaying fonts on an interlaced display of claim 1, wherein the step of obtaining an original bitmap of a character includes creating the bitmap manually.

10. The method for antialiasing fonts for and displaying fonts on an interlaced display of claim 1, wherein the step of obtaining an original bitmap of a character includes obtaining the bitmap from a bitmap description file.

11. The method for antialiasing fonts for and displaying fonts on an interlaced display of claim 1, wherein the step of performing a weighted filtering uses a plurality of coefficients which approximate a Gaussian distribution around the corresponding pixel in the original bitmap.

12. The method for antialiasing fonts for and displaying fonts on an interlaced display of claim 1, wherein the step of performing a weighted filtering uses a plurality of coefficients and includes the step of adjusting the plurality of coefficients for each font.

13. The method for antialiasing fonts for and displaying fonts on an interlaced display of claim 1, wherein the step of reducing the filtered bitmap uses a plurality of equal coefficients to compute the weighted average so that the weighted average becomes an unweighted average.

14. The method for antialiasing fonts for and displaying fonts on an interlaced display of claim 1, wherein the original bitmap is greater than or equal to two times the desired font size.

15. A method for antialiasing fonts for and displaying fonts on a television display, comprising:
    obtaining an original bitmap of a character in the font which is greater than or equal to two times a desired font size for the character;
    performing a weighted filtering on the original bitmap to form a filtered bitmap by computing each pixel in the filtered bitmap as a weighted average of pixels in the neighborhood of a corresponding pixel in the original bitmap;
    reducing the filtered bitmap to the desired size to form a reduced bitmap so that each pixel in the reduced bitmap corresponds to a corresponding block of pixels in the filtered bitmap, and each pixel in the reduced bitmap is a weighted average of pixels in the corresponding block in the filtered bitmap, the weighted average being computed using a plurality of equal coefficients so that the weighted average becomes an unweighted average;
    quantizing the reduced bitmap to form a bitmap for display by setting pixels which exceed an upper limit to the upper limit;
    storing the bitmap for display in a memory;
    retrieving the bitmap for display from the memory; and
    outputting the bitmap for display to the television display.

16. The method for antialiasing fonts for and displaying fonts on a television display of claim 15, further including the step of using pixel values within the bitmap for display to index a color map which contains a range of blendings of a font color with a background color to produce a color pixel for the bitmap for display.

17. The method for antialiasing fonts for television display of claim 15, wherein the step of quantizing the reduced bitmap includes setting pixels which are below a lower limit to the lower limit.

18. The method for antialiasing fonts for television display of claim 15, wherein the step outputting the bitmap for display includes broadcasting a signal generated from bitmap for display on a television frequency for television display.

19. The method for antialiasing fonts for television display of claim 15, wherein the step of obtaining an original bitmap of a character includes rasterizing the original bitmap from a vector description.

20. The method for antialiasing fonts for television display of claim 15, wherein the step of obtaining an original bitmap of a character includes creating the bitmap manually.

21. The method for antialiasing fonts for television display of claim 15, wherein the step of obtaining an original bitmap of a character includes obtaining the bitmap from a bitmap description file.

22. The method for antialiasing fonts for television display of claim 15, wherein the step of performing a weighted filtering uses a plurality of coefficients which approximate a Gaussian distribution around the corresponding pixel in the original bitmap.

23. The method for antialiasing fonts for television display of claim 15, wherein the step of performing a weighted filtering uses a plurality of coefficients and includes the step of adjusting the plurality of coefficients for each font.

24. A method for outputting antialiased fonts to an interlaced display, comprising:
    producing a font library containing a bitmap for each character, wherein a bitmap for each character is produced by,
        (a) obtaining an original bitmap of a character in the font which is larger than a desired font size for the character,
        (b) performing a weighted filtering on the original bitmap to form a filtered bitmap by computing each pixel in the filtered bitmap as a weighted average of pixels in the neighborhood of a corresponding pixel in the original bitmap, and
        (c) reducing the filtered bitmap to the desired size to form a reduced bitmap so that each pixel in the reduced bitmap corresponds to a corresponding block of pixels in the filtered bitmap, and each pixel in the reduced bitmap is a weighted average of pixels in the corresponding block in the filtered bitmap;
    storing the font library in a store;
    in response to a command to output a character, retrieving a bitmap for the character from the font library in the store;
    generating a bitmap for display from the bitmap for the character; and
    outputting a character generated from the bitmap for display to the interlaced display.

25. The method for outputting antialiased fonts to an interlaced display of claim 24, wherein the step of generating a bitmap for display includes using pixel values within the bitmap for the character to index a color map which contains a range of blendings of a font color with a background color to produce a color pixel value for the bitmap for display.

26. The method for outputting antialiased fonts to an interlaced display of claim 24, wherein the step of producing a font library further includes the step of quantizing the reduced bitmap by setting pixels which exceed an upper limit to the upper limit.

27. The method for outputting antialiased fonts to an interlaced display of claim 24, wherein the step of producing a font library further includes the step of quantizing the reduced bitmap by setting pixels which exceed an upper limit to the upper limit, and setting pixels which are below a lower limit to the lower limit.

28. The method for outputting antialiased fonts to an interlaced display of claim 24, wherein the step of obtaining an original bitmap of a character within the step of producing a font library includes rasterizing the original bitmap from a vector description.

29. The method for outputting antialiased fonts to an interlaced display of claim 24, wherein the step of obtaining an original bitmap of a character within the step of producing a font library includes creating the bitmap manually.

30. The method for outputting antialiased fonts to an interlaced display of claim 24, wherein the step of obtaining an original bitmap of a character within the step of producing a font library includes obtaining the bitmap from a bitmap description file.

31. The method for outputting antialiased fonts to an interlaced display of claim 24, wherein the step of performing a weighted filtering within the step of producing a font library uses a plurality of coefficients which approximate a Gaussian distribution around the corresponding pixel in the original bitmap.

32. The method for outputting antialiased fonts to an interlaced display of claim 24, wherein the step of performing a weighted filtering within the step of producing a font library uses a plurality of coefficients and includes the step of adjusting the plurality of coefficients for each font.

33. The method for outputting antialiased fonts to an interlaced display of claim 24, wherein the step of reducing the filtered bitmap within the step of producing a font library uses a plurality of equal coefficients to compute the weighted average so that the weighted average becomes an unweighted average.

34. The method for outputting antialiased fonts to an interlaced display of claim 24, wherein in the step of obtaining an original bitmap within step of producing a font library, the original bitmap is greater than or equal to two times the desired font size.

35. The method for outputting antialiased fonts to an interlaced display of claim 24, wherein the step of outputting a character generated from the bitmap for display outputs the character to a television display.

36. The method for outputting antialiased fonts to an interlaced display of claim 24, wherein the step of outputting a character generated from the bitmap for display includes broadcasting a signal generated from the bitmap for display on a television frequency for television display.

37. A method for outputting antialiased fonts to an interlaced display, comprising:

producing a font library containing a bitmap for each character, wherein a bitmap for each character is produced by,
  (a) obtaining an original bitmap of a character in the font which is greater than or equal to two times a desired font size for the character,
  (b) performing a weighted filtering on the original bitmap to form a filtered bitmap by computing each pixel in the filtered bitmap as a weighted average of pixels in the neighborhood of a corresponding pixel in the original bitmap using a plurality of coefficients to compute the weighted average,
  (c) reducing the filtered bitmap to the desired size to form a reduced bitmap so that each pixel in the reduced bitmap corresponds to a corresponding block of pixels in the filtered bitmap, and each pixel in the reduced bitmap is a weighted average of pixels in the corresponding block in the filtered bitmap, and
  (d) quantizing the reduced bitmap to form a bitmap for display by setting pixels which exceed an upper limit to the upper limit;

storing the bitmap for display in a library in a store;

in response to a command to output a character, retrieving a bitmap for the character from the font library in the store;

using the bitmap for the character to index a color map which contains a range of blendings of a font color with a background color to produce a color bitmap for the character;

outputting the color bitmap for the character to the interlaced display;

viewing the color bitmap for the character on the interlaced display; and repeating the preceding steps using a different plurality of coefficients for the weighted filtering step.

38. The method for outputting antialiased fonts to an interlaced display of claim 37, wherein the step of performing a weighted filtering within the step of producing a font library uses a plurality of coefficients which approximate a Gaussian distribution around the corresponding pixel in the original bitmap.

39. The method for outputting antialiased fonts to an interlaced display of claim 37, wherein the step of reducing the filtered bitmap within the step of producing a font library uses a plurality of equal coefficients to compute the weighted average so that the weighted average becomes an unweighted average.

* * * * *